United States Patent [19]
Lindholm

[11] Patent Number: 5,875,461
[45] Date of Patent: Feb. 23, 1999

[54] METHOD OF SYNCHRONIZING ONE OF THE OBJECTS WITH ONE OF THE THREADS AT A TIME

[75] Inventor: Timothy G. Lindholm, Palo Alto, Calif.

[73] Assignee: Sun Microsystems, Inc., Palo Alto, Calif.

[21] Appl. No.: 832,090

[22] Filed: Apr. 3, 1997

[51] Int. Cl.[6] .................................. G06F 12/08
[52] U.S. Cl. ..................... 711/118; 711/122; 711/129; 707/103
[58] Field of Search .................. 711/118, 122, 711/129, 173; 707/103, 206

[56] References Cited

U.S. PATENT DOCUMENTS

| | | | |
|---|---|---|---|
| 5,684,984 | 11/1997 | Jones et al. | 707/10 |
| 5,701,470 | 12/1997 | Joy et al. | 707/103 |
| 5,706,515 | 1/1998 | Connelly et al. | 395/676 |
| 5,752,249 | 5/1998 | Macon, Jr. et al. | 707/103 |
| 5,797,004 | 8/1998 | Lindholm et al. | 395/674 |

*Primary Examiner*—Eddie P. Chan
*Assistant Examiner*—Hiep T. Nguyen
*Attorney, Agent, or Firm*—McDermott, Will & Emery

[57] ABSTRACT

A method and apparatus for synchronizing objects is provided. A cache of synchronization constructs is provided and used to synchronize a thread with an object. A free list contains synchronization constructs not allocated to synchronize an object. A synchronization construct is allocated when at least one thread requests synchronization with an object. In response to detecting a collection enabling condition, synchronization constructs allocated to objects not synchronized with any thread are deallocated. A local hash table is assigned to each thread. The local hash table contains synchronization constructs used to synchronize objects to the thread to which the local hash table is assigned.

1 Claim, 7 Drawing Sheets

METHOD OF SYNCHRONIZING ONE OF THE OBJECTS WITH ONE OF THE THREADS AT A TIME

FIELD OF THE INVENTION

The present invention relates generally to systems and methods used in object-oriented multithreaded environments for synchronizing objects with threads of execution. In particular, it relates to an object synchronization module and associated method that use a cache of monitors for synchronizing objects with execution threads in a multi-threaded environment.

BACKGROUND OF THE INVENTION

In multiprocessor computer systems, software programs may be executed by threads that are run in parallel on the processors that form the multiprocessor computer system. As a result, a program may be run in parallel on different processors since concurrently running threads may be executing the program simultaneously. Moreover, if a program can be broken down into constituent processes, such computer systems can run the program very quickly since concurrently running threads may execute in parallel the constituent processes. Single processor, multitasking computer systems can also execute multiple threads of execution virtually simultaneously through the use of various resource scheduling mechanisms well known to those skilled in the art of multitasking operating system design.

The programs running on such computer systems may be object-oriented. In other words, the threads executing the programs may invoke methods of objects to perform particular functions. However, because of software and/or hardware constraints in the computer system, only a predefined number of objects may be allowed to implement functions at one time. For example, an object may require access to a shared computer resource, such as an I/O device, that can only handle one access at a time. Thus, since concurrently running threads may concurrently seek to invoke a method of an object, the object must be synchronized with only one thread at a time so that one thread owns and has exclusive use of the object. In other words, access to an object by a thread must be synchronized so that other threads do not have access to the object while it is synchronized with the thread.

In the past, various approaches have been used to synchronize an object with a thread. These include the use of synchronization constructs like mutexes, monitors, and semiphores. One approach that uses synchronization constructs, the run-time-allocation approach, is described in U.S. patent application No. 08/569805, entitled "OBJECT SYNCHRONIZATION MODULE AND METHOD WITH REDUCED MEMORY REQUIREMENTS", filed by Timothy G. Lindholm and Jonathan Payne on Dec. 8, 1995 (attorney docket no. A-62531).

In the run-time-allocation approach, synchronization constructs are allocated and de-allocated to objects as needed. For example, during run-time, a thread may invoke a method of an object that requires synchronization. A synchronization construct is allocated to the object if a synchronization construct has not already been allocated. When the thread exits the method that required synchronization of the thread with the object, and there are no other threads currently requiring synchronization with the object, the synchronization construct is deallocated from the object.

Synchronization constructs are stored in a data structure in global cache. Managing the allocation of these synchronization constructs to objects involves the use of other data structures which are also stored in global cache. A hash table links an object to its allocated synchronization construct. A free list contains entries identifying the synchronization constructs that are not allocated to any object.

Allocating a synchronization construct to an object entails operations which update the synchronization construct and the data structures used to manage allocation of synchronization constructs. These operations include, for example, updating the synchronization construct with information linking the synchronization construct to the object, creating an entry in the hash table linking the object to the synchronization construct, and removing the synchronization construct from the free list. Likewise, de-allocating a synchronization construct from an object includes operations such as removing an entry in the hash table linking the object to the synchronization construct, and adding the synchronization construct to the free list.

The operations involved in allocating and de-allocating synchronization constructs update data structures (i.e. the hash table, synchronization construct, and free list) in global cache. An update to a data structure in global cache requires a lock of a global data structure to prevent interference to and from other concurrently executing threads that may update the data structures. A lock of a global data structure is herein referred to as a global lock. A thread contending for a data structure globally locked by another thread is delayed until the other thread releases its global lock. Delays such as this one, which are caused by one thread contending for a data structure locked by another thread, are herein referred to as contention delays.

As threads executing in a computer system increase the number of operations performing updates on data structures in global cache, contention delays can often increase to undesirable levels. Thus frequently repeated allocations and de-allocations of synchronization constructs, which involve operations performing updates on data structures in global cache, can cause contention delays to reach undesirable levels.

Based on the foregoing, it clearly desirable to reduce contention delays caused by frequently repeated allocations and de-allocations of synchronization constructs.

SUMMARY OF THE INVENTION

A method for synchronizing objects with threads running on a computer system is described. According to one aspect of the invention, a cache of synchronization constructs is provided and used to synchronize a thread with an object. A free list contains synchronization constructs not allocated to synchronize an object. A synchronization construct is allocated when at least one thread requests synchronization with an object. In response to detecting a collection enabling condition, synchronization constructs allocated to objects not synchronized with any thread are deallocated. A local hash table is assigned to each thread. The local hash table contains synchronization constructs used to synchronize objects to the thread to which the local hash table is assigned.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for synchronizing objects is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
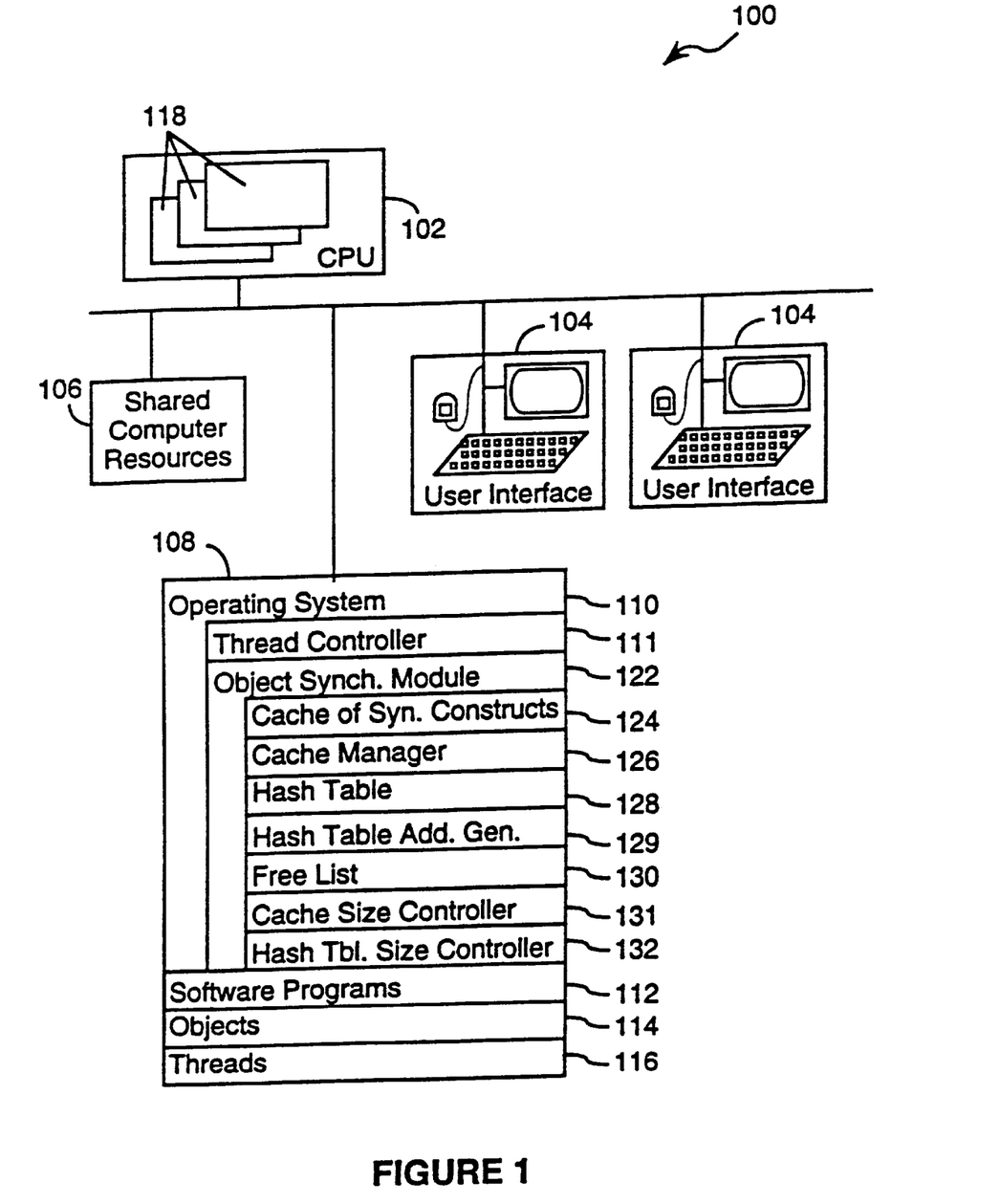
FIG. 1 is a block diagram of a multiprocessor computer system that includes an object synchronization module in accordance with the present invention.

Referring to FIG. 1, there is shown a computer system 100 in accordance with the present invention. It includes a central processing unit (CPU) 102, user interfaces 104, shared computer resources 106, and a memory 108.

The operating system 110 of the computer system 100 is stored in the memory 108 and run by the CPU 102. It controls the computer system's operation and is capable of handling a set of object-oriented multithreaded software programs 112 that are also stored in the memory along with a set of objects 114 that are accessed by the programs. Therefore, when one or more users request execution of one or more of the programs with one or more of the user interfaces 104, a thread controller 111 in the operating system 110 will generate a set of threads 116 in the memory 108 and allocate them to the one or more processors 118 of the CPU to execute the one or more requested programs.

Synchronizing Objects with Threads

Figure 2:
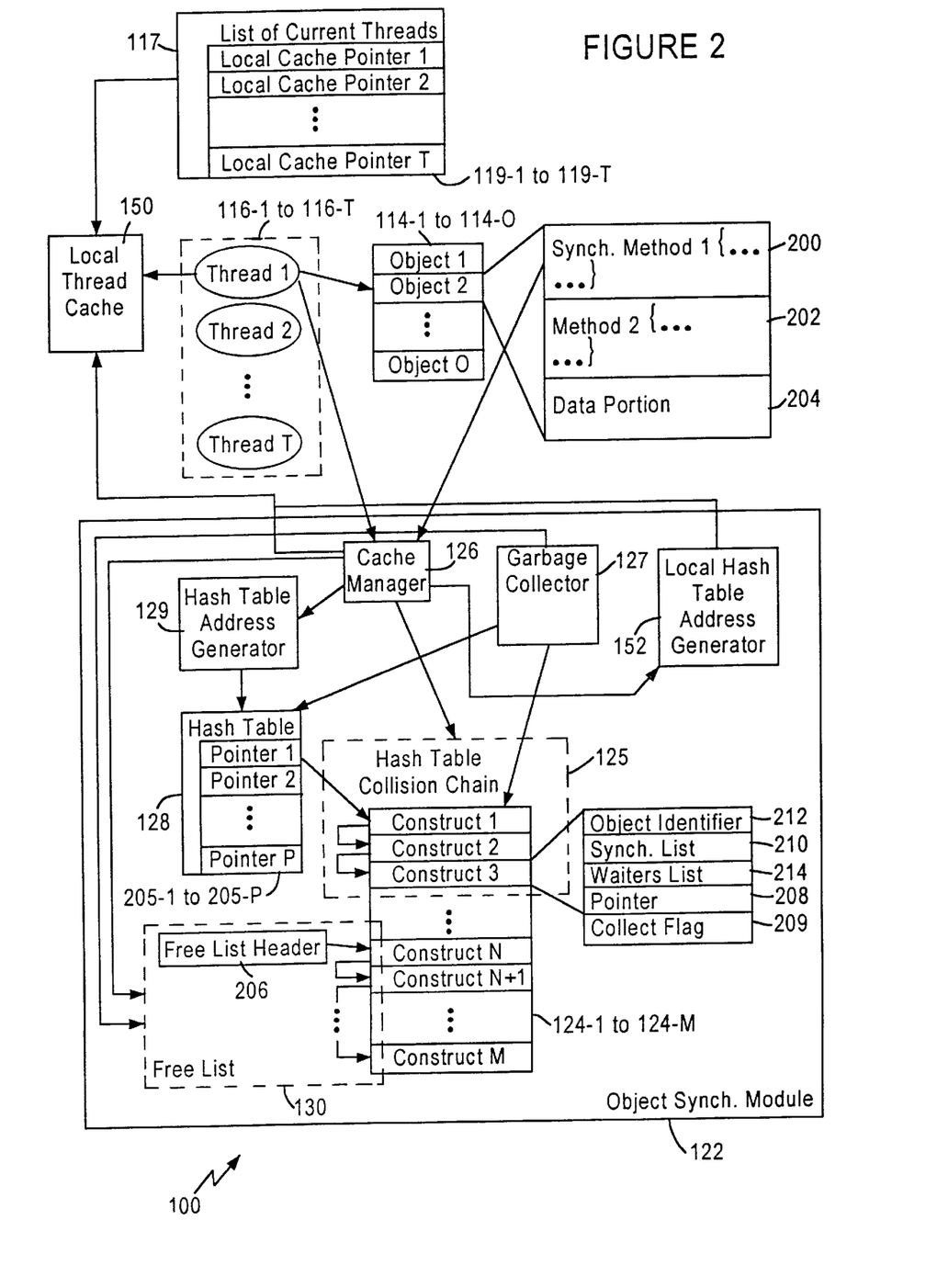
FIG. 2 is a block diagram of the data structures of the object synchronization module.

Referring to FIGS. 1 and 2, some of the objects 114 include one or more synchronizable methods (i.e., programs) 200 and associated data and data structures in the data portion 204 of the object to implement one or more functions. Referring to FIGS. 1 and 2, these methods may require access to one of the shared resources 106, which can be accessed by only a predefined number (e.g., 1 to N) of threads at a time. Thus, such methods may be explicitly declared synchronized (e.g., synchronized method 1 {...}) by the object originator (i.e., programmer) so that when one is executed by a thread, the object that contains the method will be synchronized with and owned by that thread until the method is terminated. The objects that contain these kinds of methods are considered synchronizable.

Moreover, some of the objects 114 include one or more methods 202 and associated data and data structures in the data portion 204 that may be executed in parallel by the threads 116. Thus these methods are not synchronizable and do not need to be declared synchronized (e.g., method 2 {... }} by the object originator.

Some of the objects 114 may contain both synchronizable and non-synchronizable methods 200 and 202. When one of the threads 116 accesses such a synchronizable objet, the object is not synchronized with the thread when any of its non-synchronizable methods is being executed. As a result, it will often be the case that a non-synchronizable method may be executed in parallel by more than one of the threads 116 until one of them seeks to execute one of the object's synchronizable methods. At that point, the object must be synchronized with that thread.

Moreover, in the preferred embodiment, some of the objects 114 may include a method with a section explicitly declared synchronized so that the object that contains the method with the synchronizable section will be synchronized to the corresponding thread when this section is executed. Furthermore, some of the objects may include a method with a call inside to another object or a method of the other object which is explicitly declared synchronized so that the other object will be synchronized with the corresponding thread. Therefore, objects may also be synchronizable in these ways as well. However, for purposes of illustration, only synchronization of an object that includes a method that is declared synchronized will be discussed with respect to the present invention. But, those skilled in the art will recognize that the invention is applicable as well with objects that are synchronized in the other ways just discussed.

In order to properly synchronize those of the objects 114 that are synchronizable, the operating system 110 includes an object synchronization module 122 that operates in accordance with the steps shown in FIG. 3, FIG. 4, FIG. 5, and FIG. 6. The object synchronization module includes a cache of object synchronization constructs 124, a cache manager 126, a hash table 128, a hash table address generator 129, a synchronization construct free list 130, a local hash table address generator 152, and a garbage collector 127.

Referring to FIG. 2, the hash table 128 contains a set of pointers 205. Each pointer is at a hash table address. The hash table address generator 129 maps (or hashes) the address in the memory 108 of each of the objects 114 that is to be synchronized to a corresponding address in the hash table. This is done by computing a predetermined hash function on the memory addresses of these objects to generate the corresponding hash table addresses. In order to keep the size of the hash table in the memory small, the number of synchronization constructs 124 is less than the number of synchronizable objects. Furthermore, the memory addresses of two or more objects may be mapped by the hash table function to the same hash table address. As a result, hash table collisions occur.

Figure 2A:
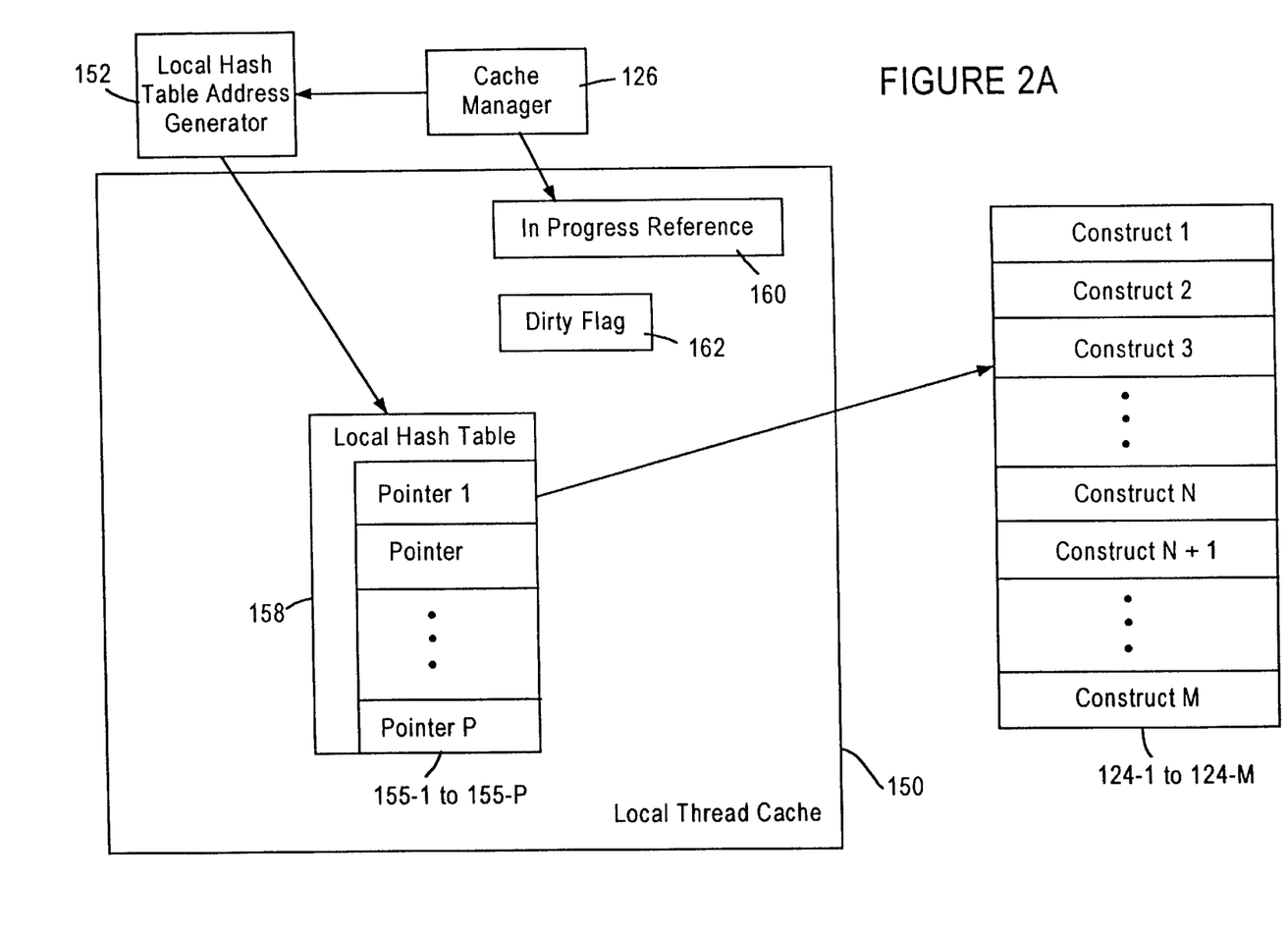
FIG. 2A is a block diagram of the data structures contained in local thread cache.

FIG. 2A shows the data structures stored in the local thread cache 150 of one of threads 116. Local thread cache is a portion of memory assigned to each thread for its private use. One advantage of using local cache is that data structures in the local thread cache of a thread are not locked before the thread accesses that data structure. Thus, the overhead and contention delays incurred in locking data structures is avoided.

Referring to FIG. 2A, local hash table 158 contains a set of pointers 155. Each pointer is at a local hash table address. Local hash table address generator 152 maps (or hashes) the address in memory 108 of each the objects 114. This is done by computing a predetermined hash function on the memory addresses of these objects to generate the corresponding hash table addresses. In order to keep the size of local hash table 158 small in the local thread cache 150 of each of threads 116, the number of pointers in set of pointers 155 may be lesser than the number of pointers in set of pointers 205. Furthermore, the memory addresses of two or more objects may be mapped by the local hash table function to the same local hash table address. As a result, local hash table collisions may occur.

Referring to FIG. 2, list of current threads 117 contains an entry associated with each of threads 116. Each entry contains a local cache pointer of local cache pointers 119. A local cache pointer from local cache pointers 119 points to the local thread cache of the thread associated with the entry containing the local cache pointer. A local cache pointer is used to access data structures in the local thread cache of the thread associated with the entry containing the local cache pointer.

In-progress reference 160 is a data structure that contains information identifying one object. Assigning a value to the in progress reference 160 is an atomic operation. Thus, when a thread begins an operation to assign a value to the in-progress reference 160, the execution of the thread assigning the value cannot be interrupted by the execution of another thread until the completion of the assignment operation. The dirty flag 162 indicates the thread has made a change to local hash table 158 after the garbage collector has modified the local hash table 158.

When one of the threads 116, for example thread 116-1, accesses one of the objects 114 that is synchronizable, object 114-2 in this example, thread 116-1 requests synchronization with object 114-2 by invoking cache manager 126 when the thread attempts to execute that method. In invoking the cache manager 126, the cache manager 126 is instructed that thread is seeking to synchronize the object. After determining that the thread is seeking to do this, the cache performs the steps shown in FIG. 3.

Figure 3:
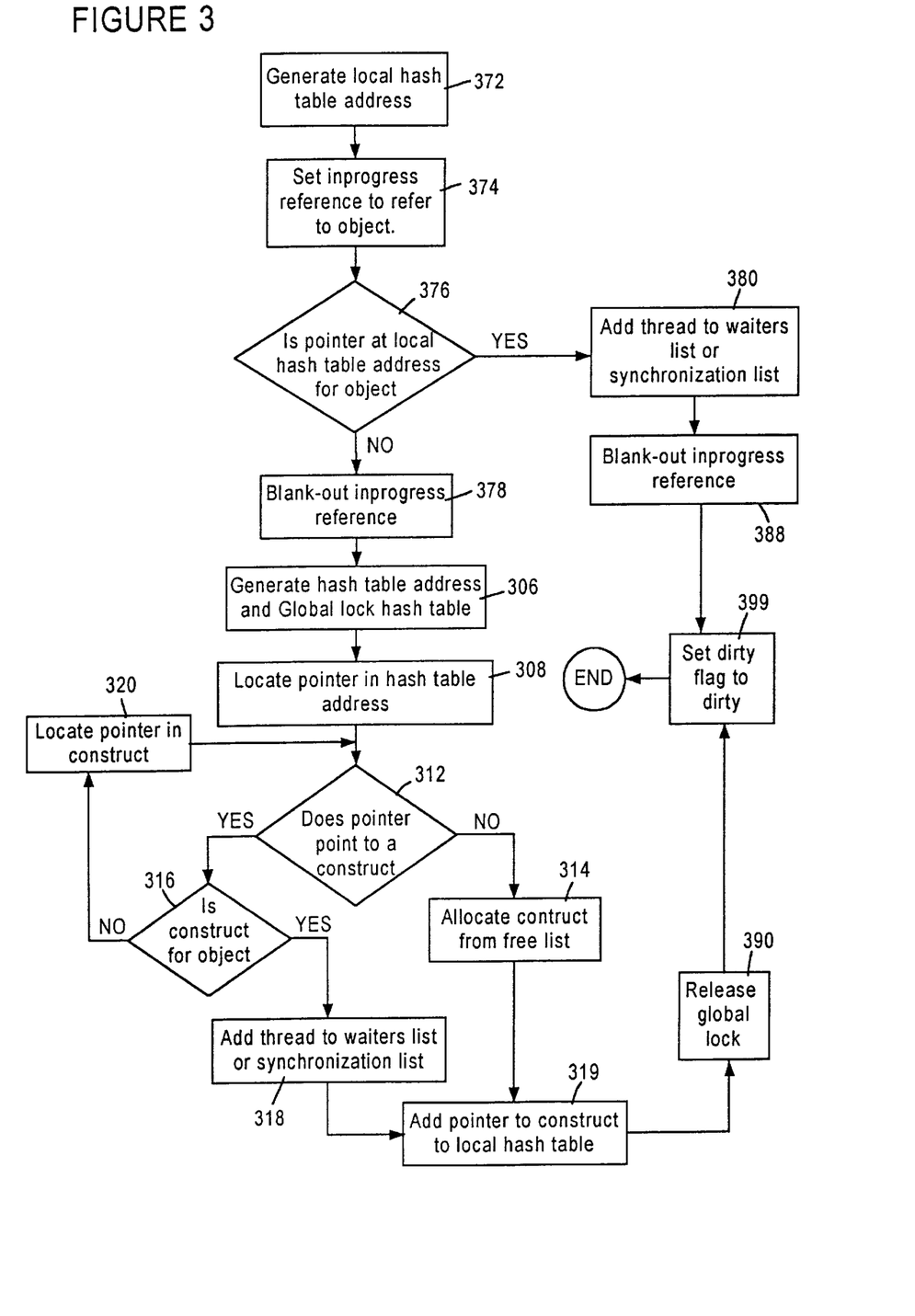
FIG. 3 is a flow chart showing the steps performed to synchronize an object with a thread.

Referring to FIG. 3, the cache manager 126 invokes the local hash table address generator 152 to generate the local hash table address to which the object's memory address is mapped (step 372 of FIG. 3). It does so by computing the predetermined local hash function on the memory address. The cache manager 126 then assigns a value to the in-progress reference 160 identifying the object (step 374 of FIG. 3). As shall be described in further detail, assigning this value identifying the object to the in-progress reference 160 indicates that the thread has begun a look-up of a synchronization construct allocated to the identified object in synchronization constructs 124.

The cache manager 126 then determines whether the pointer at the local hash table address to which the object's memory address is mapped points to a synchronization construct used to synchronize the object (step 376 in FIG. 3). The cache manager makes this determination by looking-up the synchronization construct pointed to by the pointer at the local hash table address to find the address identified by the object identifier in the synchronization construct, and comparing this address to the memory address of object 114-2. If the addresses are the same, the pointer at the local hash table address is for object 114-2. In this example, assume that none of the pointers in local hash table 158 point to a synchronization construct. This state represents the initial state of the local hash table 158 before thread 116-1 accesses any synchronizable construct. Because the pointer at the local hash table address cannot point to any synchronization construct, that pointer is not for object 114-2.

If the determination is that the pointer at the local hash table address is not for the object, cache manager 126 blanks out the in-progress reference 160 so that the in-progress reference 160 does not identify any object (step 378 in FIG. 3). The in-progress reference may be blanked out by, for example, assigning zero or null to in-progress reference 160.

The cache manager then invokes the hash table address generator 129 to generate the hash table address to which the object's memory address is mapped (step 306 of FIG. 3). It does so by computing the predetermined hash function on the memory address. The cache manager 126 then globally locks hash table 128 (step 306 of FIG. 3)

After globally locking the hash table, cache manager 126 locates the pointer in the set of pointers 205 that is at the generated hash table address (step 308 of FIG. 3). The cache manager then determines if it points to any of the synchronization constructs 124 (decision step 312 of FIG. 3). If it does not, as is the case with pointer 205-2, then this means that the object is not currently synchronized with any of the threads 116 by any of the synchronization constructs. As a result, the cache manager 126 then allocates from the synchronization construct free list 130 the first synchronization construct 124-N that is contained in the free list 130 to the object and assigns it to synchronize the object with the thread (step 314 of FIG. 3).

The free list 130 is a linked list of those synchronization constructs 124, in this case synchronization constructs 124-N to 124-M, that are not currently allocated for synchronizing those of the objects 114 that are synchronizable. It comprises a free list header 206 and a pointer 208 in each of the allocated synchronization constructs. The free list header serves as a pointer to the first synchronization construct 124-N in the free list and the pointer in each synchronization construct in the free list points to the next synchronization construct in the free list, except that the pointer of the last synchronization construct 124-M in the free list does not point to any synchronization constructs.

Each of the synchronization constructs 124 includes a synchronizers (or owner) list 210 and an object identifier 212. In allocating the first synchronization construct 124-N in the free list 130 for synchronizing the object 114-2, the cache manager 126 updates the allocated synchronization construct's object identifier with the object's address to identify the object. It then assigns the allocated synchronization construct to synchronize the thread 116-1 with the object by updating the synchronization construct's synchronizer list to include the thread. The synchronizers list lists all of the threads that are currently synchronized with (or own) the object up to the predefined number of threads that may synchronize the object.

In allocating the just allocated synchronization construct 124-N, the cache manager 126 removes the synchronization construct from the free list. It does so by updating the free list header 206 so that it points to the allocated synchronization construct 124-N+1 that is pointed to be the pointer 208 of the just allocated synchronization construct. As a result, this unallocated synchronization construct is not the first synchronization construct in the free list. In removing the just allocated synchronization construct from the free list, the cache manager also updates the pointer of the just allocated synchronization construct to not point to any other synchronization constructs, until a hash table collision occurs as will be discussed later. It also updates the located pointer 205-2 in the hash table 128 to point directly to the just allocated synchronization construct.

However, sometimes the located pointer, such as pointer 205-1, may already point to one of the synchronization constructs 124, in this example synchronization construct 124-1. In this case, the synchronization construct pointed to is the first synchronization construct in a linked hash table collision chain of one or more synchronization constructs, in this case hash table collision chain 125 with synchronization constructs 124-1 to 124-3, that each currently synchronize one of the objects 114 that has a memory address mapped to the hash table address of the located pointer. Moreover, the pointer 208 of each synchronization construct in the linked chain points to the next synchronization construct in the chain, except that the pointer of the last synchronization construct in the chain does not point to any synchronization construct.

The cache manager 126 then determines if the synchronization construct 124-1 is being used to synchronize the object 114-2 (decision step 316 of FIG. 3). In other words, the cache manager determines if a hash table collision has occurred with the located pointer. The cache manager determines this by comparing the memory address of the object 114-2 with the address identified by the object identifier 212 of the synchronization construct 124-1. If these addresses are the same, then this means that no hash table collision has occurred and that this synchronization construct is already synchronizing the object with one or more of the other threads 116-2 to 116-T.

For such an occurrence, each synchronization construct 124 includes a waiters list 214 which identifies those of the threads 116 that are waiting to synchronize an object that is already synchronized by the synchronization construct with the predefined number of threads that can be synchronized with the object. Thus, in the current example, the cache manager adds the thread 116-1 to the waiters list of the synchronization construct 124-1 and the thread waits to be synchronized with object 114-2 if there are already the predefined number of threads in the synchronizers list 210 (step 318 of FIG. 3). But, if there are less than this predefined number, then the thread is added to the synchronizers list (also step 318 of FIG. 3).

But, the address of the object 114-2 may not be the same as that identified by the object identifier 212 of the first synchronization construct 124-1 in the hash table collision chain 125 pointed to by the located pointer 205-1. This is the result of a hash table collision since the synchronization construct has been allocated for synchronizing another of the objects 114 that is synchronizable and has a memory address that the predetermined hash function has also mapped to the hash table address of the located pointer. When a hash collision occurs, the cache manager 126 locates the pointer 208 in the synchronization construct (step 320 of FIG. 3) and then repeats the just described process (step 312, step 316, and step 320 in FIG. 3) using this pointer and the pointers in succeeding synchronization constructs 124-2 and 124-3 in the chain until either the first synchronization construct 124-N in the free list 130 is allocated for synchronizing the object 114-2 (step 314 of FIG. 3) or the thread seeking to synchronize the object 114-2 is added to the waiters list 214 or synchronizers list 210 of the synchronization construct 124-1, 124-2, or 124-3 that is currently synchronizing the object 114-2 (step 318 of FIG. 3).

In repeating the process (step 312, step 316, and step 320 of FIG. 3) in this way, the cache manager 126 examines one by one the synchronization constructs 124-1 to 124-3 in the hash table collision chain 125 to determine if any of them is currently synchronizing the object 114-2. If the cache manager finally encounters the last synchronization construct in the chain and its pointer does not point to another synchronization construct, as might be the case with synchronization construct 124-3, then this means that the object 114-2 is not synchronized with any of the threads 116. In this case, the cache manager allocates the first synchronization construct 124-N in the free list 130 for synchronizing the object 114-2 in the same manner as that described earlier (step 314 of FIG. 3), except that the cache manager updates the pointer 208 of the last synchronization construct in the hash table collision chain to point to the just allocated synchronization construct. In this way, the linked chain is formed and maintained.

Once the first synchronization construct 124-N in the free list 130 is allocated for synchronizing the object 114-2 or the thread seeking to synchronize the object 114-2 is added to the waiters list 214 or the synchronizers list 210 of the synchronization construct 124-1, 124-2, or 124-3 that is currently synchronizing of the object 114-2, the cache manager 126 enters the pointer referring to the synchronization construct allocated to object 114-2 to local hash table 158 (step 319 in FIG. 3). The cache manager 126 enters the pointer by setting the pointer at the local hash table address previously generated for the object to refer to the synchronization construct used to synchronize the object.

Because the memory address of two or more objects can hash to the same local hash table address, a pointer to a first object that is stored at a local hash table address may be overwritten by a second object when adding the pointer to the second object to the local hash table at the same local hash table address (Step 319 in FIG. 3). This overwriting will not cause any errors because the thread in any future accesses to a synchronizable method of the first object verifies that the pointer at the local hash table address mapped to the first object's memory address does point to the synchronization construct allocated to the first object (e.g. step 376 in FIG. 3). If that pointer does not point to the synchronization construct allocated to the first object, then the thread uses the hash table 128 to access the appropriate synchronization construct for the object (i.e. step 306 and step 308 in FIG. 3). While overwriting may cause the thread to invoke a global lock to access hash table 128, the number of global locks on a global hash table or other global data structure is reduced as compared to a method of synchronization that requires a global lock of a global hash table or other global data structure every time a synchronization construct is accessed. This reduction in global locks on global data structures reduces overhead and contention delays.

The local hash table 158 does not provide a hash table collision mechanism. Not providing a collision mechanism avoids the overhead incurred in maintaining a collision mechanism, such as the overhead incurred when linking and de-linking members of a collision chain. For a given thread, the overhead avoided by not providing a collision mechanism is typically much greater than the overhead avoided by using a collision mechanism to avoid having to use a global lock on hash table 128 in order to access a synchronization construct. Furthermore, not having to maintain a collision mechanism in a hashing scheme provides a quicker scheme than a hashing scheme that does provide a collision mechanism. A quicker hashing scheme is an advantage for the common case of repeatedly accessing a synchronized method of the same object. When repeatedly accessing a synchronized method of the same object, the pointer to the synchronization construct used to synchronize the object very likely remains in local hash table 158, thus eliminating the need and cost of globally locking hash table 128 in order to obtain a pointer to the synchronization construct used to synchronize the object, while providing the performance benefit offered by a quicker hashing scheme.

After adding a pointer to local hash table 158, the cache manager 126 then releases the global lock on hash table 128 (step 390 in FIG. 3). Finally, the dirty flag is set to indicate that the local hash table 158 has been modified (i.e. is dirty) (step 399 in FIG. 3), and cache manager 126 exits.

In this example, assume that thread 116-1 once again requests synchronization with object 114-2, and that the pointer at the local hash table address that maps to the memory address of object 114-2 points to the synchronization construct allocated to object 114-2. Once the cache manager is invoked, it generates a local hash table address (step 372 in FIG. 3) and sets the in-progress reference 160 to identify the object (step 374 in FIG. 3) in the same manner as before.

The cache manager determines that the pointer at the local hash table address does refer to a synchronized construct being used to synchronize object 116-1 (step 376 in FIG. 3). When this determination is made, the cache manager either adds the thread to the waiters list or the synchronization list of the synchronization construct (step 380 in FIG. 3) in the same manner described in step 318. The cache manager then blanks-out the in-progress reference (step 388 in FIG. 3) in the manner described in step 378. Finally, the dirty flag is set to indicate that the local hash table 158 has been modified (i.e. is dirty) (step 399 in FIG. 3). The cache manager then exits.

De-Synchronization of Objects when Synchronization is completed

When the synchronizable method 200 of one of the objects 114, such as object 114-2, is terminated, synchronization of the object with whichever of the threads 116, such as thread 116-1, is completed. When this occurs, the synchronizable method invokes the cache manager 126 to instruct it that the thread is requesting to de-synchronize the object. In response, the cache manager 126 performs the steps shown in FIG. 4.

Figure 4:
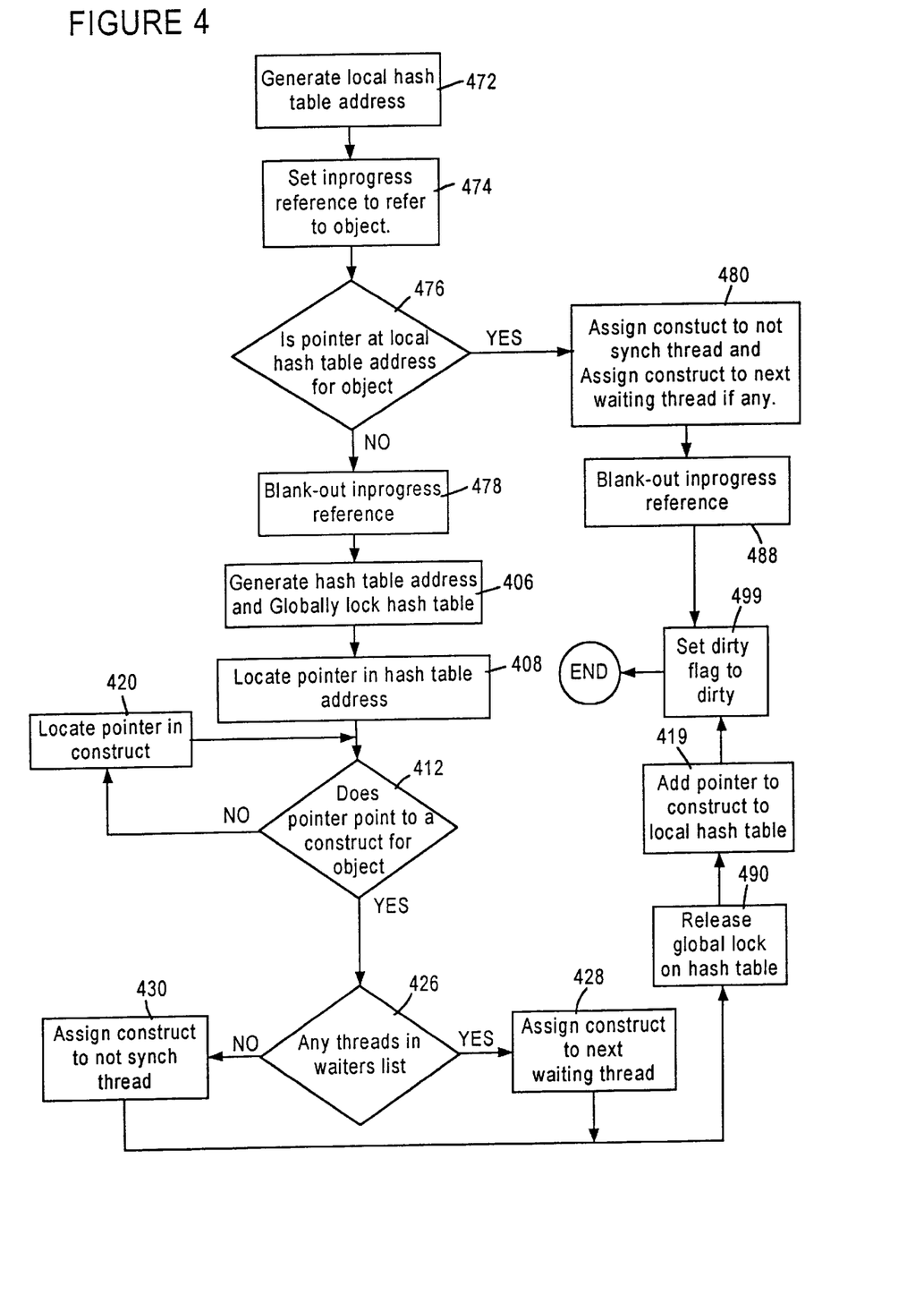
FIG. 4 is a flow chart showing the steps performed to de-synchronize an object with a thread when the thread finishes executing a synchronized method.

Referring to FIG. 4, cache manager 126 generates a local hash table address (step 472 in FIG. 4) in the same manner described in step 372, and then sets the in-progress reference 160 to identify the object requesting de-synchronization (step 474 in FIG. 4) in the same manner described in step 374. Cache manager 126 then determines whether the pointer at the local hash table address to which the object's memory address is mapped points to a synchronization construct used to synchronize the object (step 476 in FIG. 4) in the same manner as described in step 376.

If the determination is that the pointer at the local hash table address does not point to the synchronization construct used to synchronize the object 114-2, the cache manager then blanks out the in-progress reference 160 (step 478 in FIG. 4) in the same manner described in step 378.

After blanking out the in-progress reference, cache manager 126 invokes the hash table address generator 129 to generate the hash table address to which the memory address of the object 114-2 is mapped and globally locks hash table 128 (step 406 of FIG. 3). The cache manager 126 then locates the pointer, for example pointer 205-1, in the hash table 128 at the generated hash table address (step 408 of FIG. 3). This is all done in the same manner described in step 306 and step 308 respectively.

The cache manager 126 then determines if the first synchronization construct 124-1 in the hash table collision chain 125 pointed to by pointer 205-1 is already synchronizing the object 114-2 (decision step 412 of FIG. 4). This is done in the same manner as described in step 312.

If the synchronization construct 124-1 is already synchronizing the object 114-2, then the cache manager 126 determines from the waiters list 214 of the synchronization construct if any of the threads 116-2 to 116-T are waiting to synchronize the object (decision step 426 of FIG. 4). If there are any threads in the waiters list, cache manager 126 assigns the synchronization construct to synchronize the object with the next thread in the waiters list 214 (step 428 of FIG. 4). It does so by removing the thread from the waiters list and updating the synchronizers list 210 of the synchronization construct to identify this thread. As a result, the thread 116-1 has been de-synchronized with the object, but the next thread in the waiters list has been synchronized with the object.

However, if there are no threads in the waiters list 214 of the synchronization construct 124-1, then the cache manager 126 maintains allocation of the synchronization construct and assigns the synchronization construct to not synchronize the thread 116-1 with the object 114-2 by simply removing the thread from the synchronizers list 210 (step 430 of FIG. 4).

Furthermore, the first synchronization construct 124-1 in the chain may not be synchronizing the object 114-2. In this case, the cache manager 126 locates the pointer 208 of the synchronization construct (step 420 of FIG. 4) and then repeats the just described process (step 412 and step 420 of FIG. 4) using this pointer and the pointers in succeeding synchronization constructs 124-2 and 124-3 in the hash table collision chain 125.

By repeating this process (step 412 and step 420 of FIG. 4) in this manner, cache manager 126 examines one by one the synchronization constructs 124-1 to 124-3 in the hash table collision chain 125 to determine which of them is currently synchronizing the object 114-2. When the cache manager finally encounters the synchronization construct that is, the object is de-synchronized with the thread 116-1. As discussed above, this may occur by assigning the synchronization construct to not synchronize the object with the thread (step 430 of FIG. 3), or re-assignment of the synchronization construct (step 428 of FIG. 3). Then cache manager 126 releases the global lock on hash table 128 (step 490 in FIG. 4), enters the pointer referring to the synchronization construct allocated to object 114-2 to local hash table 158 (step 419 in FIG. 4) in the same manner described in step 319. Finally, the dirty flag is set to indicate that the local hash table 158 has been modified (i.e. is dirty) (step 499 in FIG. 4). Since de-synchronization of the object 114-2 with the thread 116-1 has completed, the cache manager 126 exits.

Assume that in this example thread 116-1 requests de-synchronization with object 114-2 and that the pointer at the local hash table address that maps to the memory address of object 114-2 points to the synchronization construct allocated to object 114-2. Under this assumption, the determination at step 476 would be that the pointer at the local hash table address does refer to a synchronized construct being used to synchronize object 114-2 (step 476 in FIG. 3). Then the cache manager 126 either assigns the synchronization construct to not synchronize the thread (step 480 in FIG. 4) or assigns the synchronization construct to the next waiting thread (step 480 in FIG. 4) in the same manner as described in step 430 and step 428. The in-progress reference is blanked out (step 488 in FIG. 4) in the same manner described in step 378. Finally, the dirty flag is set to indicate that the local hash table 158 has been modified (i.e. is dirty) (step 499 in FIG. 4). Then the cache manager exits.

De-Synchronization of Objects when Thread is killed

Synchronization of one of the objects 114, such as object 114-2, with one of the threads 116, for example thread 116-1, is to be aborted (or killed) when the thread is killed (or dies). When this occurs, the thread invokes the cache manager 126 and instructs it that the thread has been killed and that synchronization of any object with the thread should be aborted. In response, cache manager 126 executes the steps shown if FIG. 5.

Figure 5:
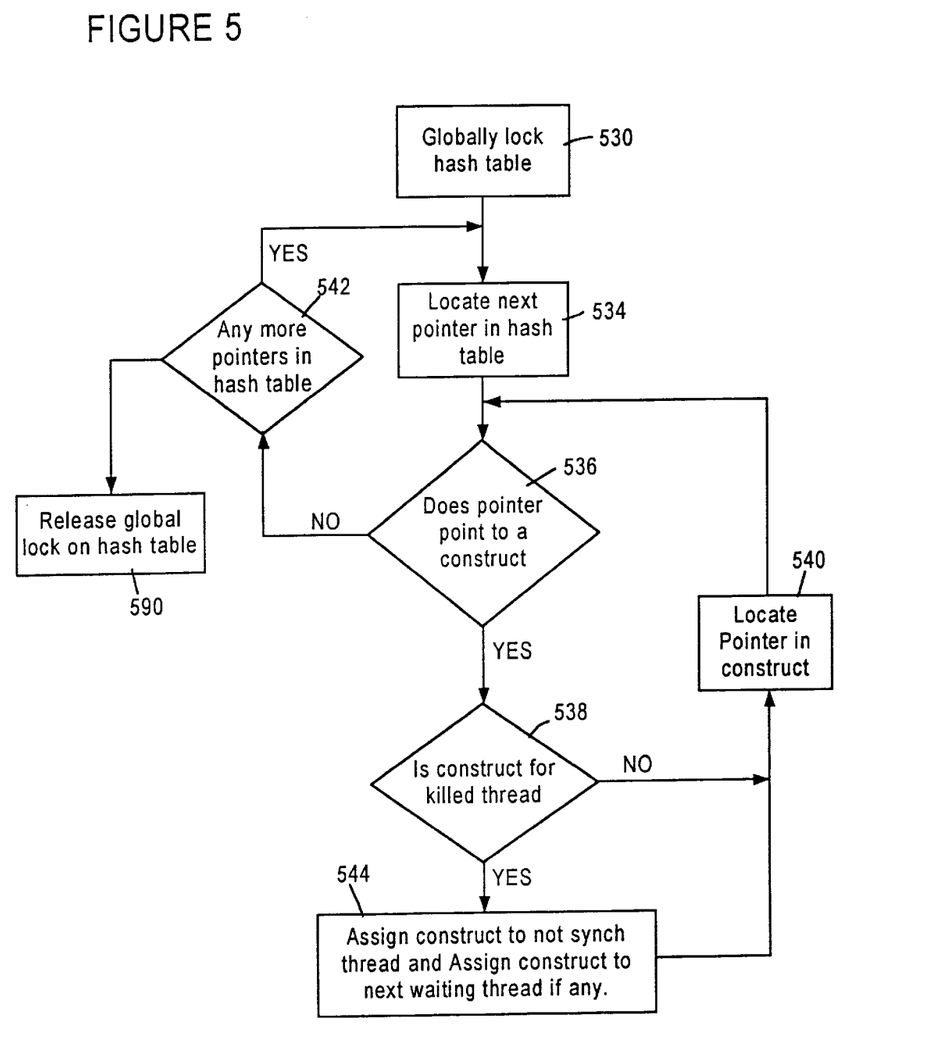
FIG. 5 is a flow chart showing the steps performed to de-synchronize the objects synchronized with a thread when the thread is aborted or killed.

Cache manager 126 globally locks hash table 128 (step 530 in FIG. 5). Cache manager 126 then locates the first pointer in the set of pointers 205 in the hash table 128 (step 534 of FIG. 5) and determines if it points to any of the synchronization constructs 124 (decision step 536 of FIG. 5). If it does, as in the case of pointer 205-1, then the cache manager determines if the first synchronization construct 124-1 in the chain pointed to by the pointer is synchronizing the object 114-2 that is synchronized with the killed thread 116-1 (decision step 338 of FIG. 3). It does so by determining if the synchronizer list 210 of the synchronization construct lists this thread. Then the cache manager 126 either assigns the synchronization construct to not synchronize the thread (step 544 in FIG. 5) or assigns the synchronization construct to the next waiting thread (step 544 in FIG. 5) in the same manner as described in step 480 in FIG. 4.

However, the cache manager 126 may determine that the synchronization construct 124-1 is not synchronizing the object 114-2 that is synchronized with the killed thread 116-1. When this occurs, the cache manager locates the pointer in the synchronization construct (step 540 of FIG. 5) and repeats the just described process (steps 536 to 544 in FIG. 5) using this pointer and the pointers of the succeeding synchronization constructs 124-2 and 124-3 in the hash table collision chain 125, until the last synchronization construct 124-3 in the chain is encountered and does not point to any other synchronization constructs 124 (decision step 536 of FIG. 5). If the latter is the case, then the entire process (steps 536 to 544 of FIG. 5) is repeated for the next pointer, for example pointer 205-2, in the hash table 128 until there are not more pointers in the hash table (decision step 550 of FIG. 5). The cache manager releases its global lock of hash table 128 (step 590 of FIG. 5), and then exits.

Garbage Collection

Garbage collection is the mechanism by which synchronization constructs are de-allocated from objects no long requiring synchronization with any thread. Garbage collector 127 is invoked by cache manager 126 in response to cache manager 126 detecting a garbage collection enabling condition. A garbage collection enabling condition may include for example, the free list 130 not containing any synchronization constructs to allocate in step 314 in FIG. 3. The cache manager could then invoke garbage collector 127 to free up synchronization constructs not being used to synchronize an object with at least one thread in a manner which shall be described. The garbage collector also sets the pointers in the local hash table to not point to a synchronization construct when setting the pointers to not point can be accomplished without causing the thread to encounter an erroneous view of the state of the synchronization constructs pointed to by the thread's local hash table 158. After the pointer to a synchronization construct in the local hash table 158 is set to not point to a synchronization construct, when the thread looks-up a synchronization construct it simply reverts to the globally available hash table 128 in the manner described in step 376 and step 476. The garbage collector, when invoked, executes the steps shown in FIG. 6.

Figure 6:
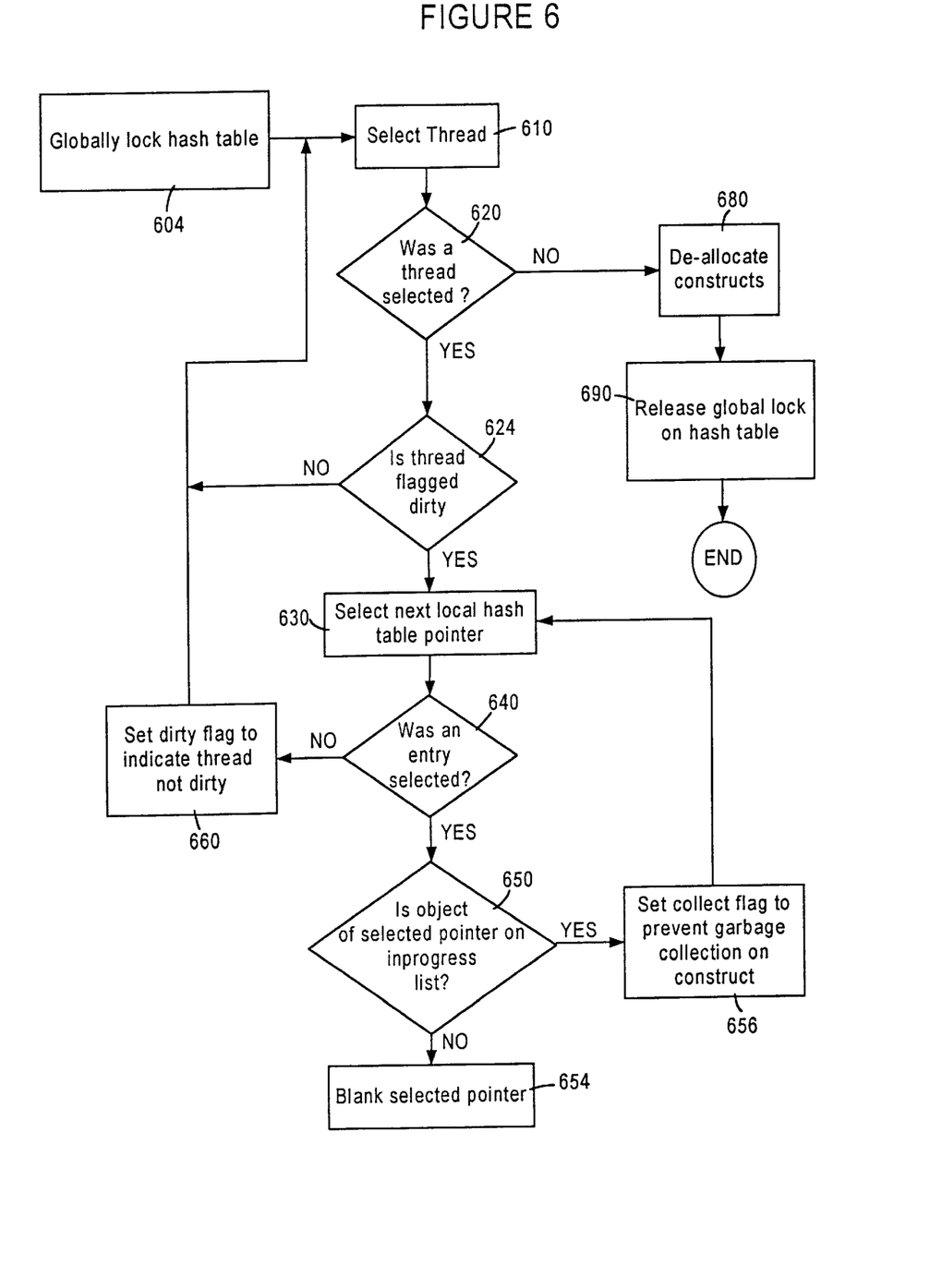
FIG. 6 is a flow chart showing the steps performed to de-allocate synchronization constructs allocated to objects not synchronized with a thread.

Referring to FIG. 6, the garbage collector 127 globally locks hash table 128 (step 604). Garbage collector then selects a thread (step 610 of FIG. 6) by iterating through each entry in list of current threads 117. Garbage collector 127 then determines whether a thread was selected. If a thread was not selected, then each thread as been iterated through. The garbage collector then de-allocates synchronization constructs that are not being used to synchronize objects with one or more threads to free them for future allocation (step 680 of FIG. 6). The synchronization constructs are de-allocated in a manner which shall be described in further detail.

If a thread was selected, the garbage collector 127 then determines whether the thread has been flagged as dirty (step 624 of FIG. 6). If the thread has not been flagged as dirty, then the selected thread has not modified the local hash table (i.e. by entering a new pointer to a synchronization construct) since the last invocation of garbage collector 127. Therefore, there is no new pointer for which the garbage collector to set to not point, and the thread may thus be ignored. Garbage collector 127 makes this determination by accessing the dirty flag 162 using the local cache pointer contained in the entry associated with the selected thread, and then examining the value stored in the dirty flag 162. If the dirty flag 162 is set to a value indicating that that the thread is not dirty, then garbage collector selects another thread (step 610 of FIG. 6).

If the determination made is that the selected thread is dirty, then garbage collector 127 accesses the local hash table using the local cache pointer contained in the entry associated with the selected thread to select the next pointer in local hash table 158 of the selected thread (step 630 of FIG. 6) starting with the pointer at the first local hash table address. Then garbage collector 127 determines whether a pointer was selected for the local hash table 158 (step 640 of FIG. 6). If none was selected, then garbage collector 127 has iterated through all the pointers. Garbage collector 127 then sets dirty flag 162 to a value indicating that the thread is not dirty (step 660 of FIG. 6). Note as previously described, when a thread modifies its local hash table 158, it sets dirty flag 162 to a value indicating that the thread is dirty (i.e. has modified its local hash table 158). Garbage collector 127 then selects a next thread (step 610 of FIG. 6).

If garbage collector 127 determined that a next pointer was selected, then garbage collector 127 determines whether the synchronization construct pointed to by the selected pointer is allocated to the same object identified by in-progress reference 160. If the synchronization construct pointed to by the selected pointer is allocated to the same object identified by in-progress reference 160, then the selected thread could have begun a look-up on the synchronization construct using the pointer to the synchronization construct in the local hash table 158 (e.g. step 476 or step 376).

Note the possibility that the selected thread could have then further determined that the synchronization construct was allocated to the object identified by object identifier 212 of the synchronization construct. After making this determination, the execution of the selected thread could have been suspended by operating system 110, as occurs in multithreaded environments, to permit another thread to execute. The other thread could invoke garbage collector 127, which could de-allocate the synchronization construct that the selected thread, from its point of view, has determined is allocated to the identified object. When the selected thread begins to execute again, it operates under the erroneous view that the synchronization construct is allocated to the identified object. To prevent such errors, garbage collector 127 sets a collect flag 209 in the synchronization construct allocated to the object identified by the in-progress reference of the selected thread to a value indicating to garbage collector 127 to not de-allocate the synchronization construct (step 656 of FIG. 6) in step 680.

If the synchronization construct pointed to by the selected pointer is not allocated to the same object identified by in-progress reference 160, then garbage collector 127 blanks out the selected pointer to not point to a synchronization construct (step 654 in FIG. 6). When a pointer in local hash table 158 in the local thread cache of a thread does not point to a synchronization construct, the next time the thread needs to access the synchronization construct allocated to an object whose memory address maps to the local hash table address where the pointer resides, the thread reverts to using hash table 128 in order to access the synchronization construct.

Once every thread has been selected (i.e. has been iterated through) as determined in step 620 of FIG. 6, garbage collector 127 de-allocates the synchronization constructs not being used to synchronize an object with a thread, unless the collect flag 209 of a synchronization construct indicates not to de-allocate the synchronization construct (step 680 of FIG. 6). In step 680 of FIG. 6, garbage collector 127 iterates through each pointer in hash table 128. For each iteration of each pointer, garbage collector 127 iterates through each member synchronization construct of the collision chain pointed to by the pointer in the hash table 128. For each synchronization construct, garbage collector 127 examines the synchronization constructs collect flag 209. If the value of the collect flag indicates that the synchronization construct cannot be de-allocated, then garbage collector 127 sets the value in collect flag 209 to indicate that the synchronization construct can be deallocated. Garbage collector 127 then skips de-allocation of that synchronization construct and continues iterating.

If the value of the collect flag 209 indicates that the synchronization construct can be de-allocated, then garbage collector 127 determines whether the synchronization construct is being used to synchronize an object with a thread. When the synchronization list 210 contains no more than zero members, then the synchronization construct is not being used to synchronize an object with a thread.

If garbage collector 127 determines that the synchronization construct is not being used to synchronize an object with a thread, garbage collector 127 then deallocates the synchronization construct and returns it to the free list 130. It does so by updating the pointer of the de-allocated synchronization construct to point to the first synchronization construct 124-N in the free list 130 and updating the free list header 206 to point to the de-allocated synchronization construct. Thus, the deallocated synchronization construct also requires updating either the pointer 205-1 in the hash table to point to the next synchronization construct 124-2 in the hash table collision chain 125, or revision of the pointer 208 of the synchronization construct 124 in the chain just before the de-allocated synchronization construct to the next synchronization construct, if any, in the chain so as to properly update the chain.

If the synchronization construct de-allocated is not the first synchronization construct in the chain, the cache manager updates the pointer of the synchronization construct in the chain that points to the de-allocated synchronization construct so that it points to the synchronization construct that is pointed to by the pointer of the de-allocated synchronization construct. But, if the de-allocated synchronization construct is the last synchronization construct in the chain, the cache manager updates the pointer of the synchronization construct in the chain whose pointer points to the de-allocated synchronization construct to not point to any of the synchronization constructs 124 so that it is now the last synchronization construct in the chain.

Finally, garbage collector 127 releases it global lock on hash table 128 (step 690 in FIG. 6). Garbage collector 129 then exits.

Additional Features and Alternative Embodiments

In the preferred embodiments access to the cache manager 126 itself is managed by a dedicated synchronization construct. In this way, only one thread of execution can access the cache manager at a time, and all subsequent synchronization construct manager requests are put on a waiting thread list until the first thread completes its use of the cache manager.

One embodiment of the invention has been described as utilizing synchronization constructs 124 for synchronizing objects 114 with threads 116. These synchronization constructs may be well known synchronization constructs such as mutexes, monitors, and semiphores.

In the case where the synchronization constructs 124 are mutexes, the mutexes may simply operate in the way described earlier without any additional synchronization features. Moreover, the predefined number of threads 116 that can be synchronized with one of the objects 114 at a time may be one. Therefore, a mutex is locked when it is allocated and has its synchronizers list 210 (or synchronizer identifier in the case where only one thread can be synchronized with an object) updated to identify the thread that is synchronized with an object and unlocked when it is de-allocated.

However, when the synchronization constructs 124 are monitors that monitor synchronization of the objects 114, they may additionally include a suspenders list. The suspenders list of a monitor contains those of the threads 116 that have suspended their synchronization with the object that has its synchronization monitored by the monitor. A thread is added to the suspenders list when the data required by a synchronized method of the objects has not yet become available. This is done with a condition variable in the synchronized method that notifies the cache manager 126 to add the thread to the suspenders list when the data is not available. When the data does not become available, the method that makes the data available notifies the cache manager that the data is available and the cache manager removes the thread from the suspenders list and synchronization of the thread with the object resumes.

In the case where the synchronization constructs 124 are semiphores, the predefined number of threads 116 that may be synchronized with one of the objects 114 at one time may be N. As a result, up to N threads may be listed in the synchronizers list 210 at one time while waiting threads are listed in the free list 130.

Furthermore, the invention had also been described as embodying synchronization constructs that include pointers that can be used to provide a free list of synchronization constructs that are not allocated and that can be also used to simultaneously provide chains of allocated synchronization constructs of synchronizable objects that have memory addresses mapped to the same hash table addresses. However, those skilled in the art will recognize that other schemes may be used to provide a free list of Allocated synchronization constructs and to track hash table collisions caused by synchronization constructed objects that have memory addresses mapped to the same hash table address.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a computer system that includes a plurality of threads and a set of objects that each can only be synchronized with one of the threads at a time, a method of synchronizing one of the objects with one of the threads at a time, the method comprising the steps of:

providing a cache of synchronization constructs, a number of the synchronization constructs being less than a number of the objects;

providing a free list of each of the synchronization constructs that is not currently allocated;

allocating respective ones of the synchronization constructs from said free list to respective ones of the objects when at least one of said threads requests synchronization with said ones of the objects; and     in response to detecting a collection enabling condition, deallocating one of said synchronization constructs from a corresponding one of said objects and returning said deallocated synchronization construct to said free list when none of said threads is currently synchronized with said corresponding one of said objects;

providing a local hash table for each one of said threads, wherein each said local hash table is assigned to each one of said threads; and     maintaining in said local hash table a set of references to synchronization constructs used to synchronize said one of said threads to which said local hash table is assigned with said ones of the objects.

\* \* \* \* \*